Patented Sept. 12, 1944

2,357,830

UNITED STATES PATENT OFFICE 2,357,830

MANUFACTURE OF EXPLOSIVES

Delbert R. Jones, East Alton, Ill., assignor to Western Cartridge Company, East Alton, Ill., a corporation of Delaware No Drawing. Application July 16, 1941,
Serial No. 402,718

12 Claims. (Cl. 260—577)

This invention pertains to the manufacture of tetryl, and more particularly to a method of producing free-flowing tetryl of high gravimetric density.

Heretofore, considerable difficulty has been encountered in converting crude tetryl as obtained from nitration processes into a finished product having the desired granular form as well as high chemical purity and stability. Crystallization from solution in a water-immiscible solvent such as benzene, toluene, or ethylene dichloride has been found to be disadvantageous in that the resulting product contained a sufficient proportion of elongated crystals as to display poor flowing qualities and an undesirably low gravimetric density. Granulation of the explosive by slowly adding a solution in a volatile water-immiscible organic solvent to water maintained at an elevated temperature so as to eliminate the solvent by vaporization upon the addition of the solution to the water, has the disadvantage of making no provision for purification, since water-insoluble impurities are deposited with the explosive due to the complete removal of the organic solvent. Prior methods in which the solid explosive was directly precipitated by mixing a solution in a water-miscible solvent with an excess of water have resulted in products having inadequate stability or granulation characteristics.

It is an object of the present invention to provide an improved process for the granulation of tetryl whereby the disadvantages of prior procedures are overcome.

It is another object of this invention to provide improved conditions of treatment whereby desirable granular tetryl may be obtained from a solution of the explosive in a water-miscible solvent.

It is a further object of this invention to provide an improved procedure whereby solidified tetryl may be obtained from a solution in a water-miscible solvent at the desired granulation and density coincidentally with a favorable extent of purification.

Another object of this invention is the provision of an improved procedure for the separation of tetryl from solution in a water-miscible solvent which is adapted for the production of large amounts of material in a continuous mode of operation in inexpensive equipment.

Other objects will be apparent from the following detail description.

The accomplishment of the foregoing objects with the resulting advantages is secured in accordance with this invention by providing conditions such that on mixing water and a solution of tetryl in a water-miscible solvent, the tetryl initially separates as a liquid phase which persists for some time and subsequently becomes converted into solid granules or agglomerates. Procedures involving the intermediate formation of such a liquid tetryl phase result in a product which is not only of desired particle size, shape, and density, but also exhibits a much greater extent of purification than products obtained by mixing water and solutions of tetryl under conditions such that the intermediate liquid phase does not appear.

The attainment of these improved results has been found to be made possible by the provision of a 25%–50% solution by weight of tetryl in acetone or other water-miscible solvent at a temperature between about 40° C. and the boiling point of the solvent and not higher than about 90° C., and the admixture of this solution and an amount of hot water for example, at a temperature above 50° C., equal to 3-5 times the weight of the tetryl, the mixing being effected by means of vigorous agitation. When the foregoing conditions are observed, the tetryl first separates in the form of oily liquid globules, which, if the agitation is stopped, coalesce into a separate liquid layer, which solidifies shortly thereafter.

In the actual practice of the process, the agitation is preferably maintained uninterrupted throughout, from the time of mixing until after the desired product has been formed. Some time after their initial appearance, the oily droplets begin to solidify, forming particles of plastic solid, and then suddenly harden into rigid solid bodies, this latter change being accompanied by a change in color from brownish yellow to a pale yellow.

The occurrence of this intermediate state of the tetryl in the form of an oily liquid layer in the present improved procedure is considered essential and appears to be the characteristic feature to which the improved results may be largely attributed. The liquid state provides favorable conditions for purification of the tetryl and at the same time facilitates the obtainment of solidified particles having the desired granular form, size, and gravimetric density.

The process of this invention is adapted for the treatment of tetryl not having the desired high gravimetric density or granular form, and particularly of crude tetryl obtained by the nitration with mixed acid of dimethylaniline or preferably of dinitromethylaniline. The tetryl may initially be in a dry state, but is generally most conveniently treated having a residual moisture content of for example, 8%–15%.

The solvent which is used must be capable of forming a solution of at least 25% by weight of tetryl at a temperature of about 90° C. or lower and must be completely miscible with water in the proportions hereinafter specified. Suitable organic liquids which may be used alone or in admixture are, for example, acetone, methyl ethyl ketone, methyl acetate, dioxane, ethylene glycol mono-alkyl (such as methyl, ethyl, or butyl) ether, or diethylene glycol mono-alkyl (such as methyl, ethyl, or butyl) ether. The solvent may also contain a small proportion of water and/or one or more organic liquids in an amount not impairing the complete water-miscibility or the solvent power for tetryl. Examples of such liquids which may be added in small proportions, generally not to exceed 20% by volume, are methyl, ethyl, and isopropyl alcohols, benzene, toluene, chlorobenzene, ethylene chloride, trichloroethylene, methyl isobutyl ketone, or ethyl acetate.

It is generally preferable to use a simple solvent in the present process due to the ease with which it may then be recovered from the mother liquor. However, a mixed solvent may at times offer certain advantages such as the opportunity to adjust the boiling point to any desired value or the obtainment of specific desirable effects on either the granulation or the purification or both of the tetryl. Frequently, in such cases, the problem of solvent recovery may be simplified by the use of a constant-boiling solvent mixture.

Since basic substances react rapidly with and decompose tetryl, the presence of bases such as pyridine and organic amines in the solvent is to be avoided.

In accordance with the process of this invention which is preferably carried out at atmospheric pressure, a 25% to 50% by weight solution of tetryl is prepared in the solvent, the temperature of the solution being adjusted to a value between about 40° C. and the boiling point of the solvent and not higher than about 90° C.

An amount of water equal to 3–5 times the weight of the tetryl is provided at a temperature between about 50° and 90° C. such that the resulting mother liquor will have a temperature below its boiling point.

The water and the solution are rapidly mixed in a covered vessel, at the stated proportions and temperatures, during vigorous agitation, conditions being preferably maintained during the mixing operation so as to avoid any substantial loss of solvent by vaporization. The tetryl first separates in the form of liquid globules, which, after persisting for at least thirty seconds to several minutes, become converted into the desired solid granules.

By means of this procedure, using suitable vigorous agitation, the product consists of free-flowing non-dusting tetryl, consisting of roughly spherical individual particles or agglomerates. About 80%–95% of the particles will have a size such that they pass through a 20 mesh screen (0.0336″ opening) and are retained on a 100 mesh screen (0.006″ opening), the balance consisting of approximately equal proportions of material retained on a 20 mesh screen and passing through a 100 mesh screen respectively. The gravimetric density of the product is within the range of about 0.80 to 0.95, as contrasted with the value of about 0.60 characteristic of material produced by crystallization from benzene or a similar solvent.

The mixing of the tetryl solution and the water may be accomplished by subjecting either of the two liquids to vigorous agitation in a suitable vessel and rapidly adding the other. Preferably, however, the two liquids are added simultaneously at the proper rate to vigorously agitated mother liquor, obtained from a previous precipitation.

Any significant departure from the above-specified conditions of temperature and concentration will result in a product which is less desirable especially in respect of purity, as evidenced particularly by the 120° C. vacuum stability test, in which measurement is made of the volume of gas liberated by a 5 gram sample heated for 40 hours at 120° C. under vacuum. Material prepared in accordance with the process of this invention has displayed greater stability, i. e., a smaller evolution of gas, than products prepared using the same materials under different conditions. Departures from the conditions stated above have been shown to result also in deficiencies of the product with respect to physical properties, for example, the particles may be finer or coarser than desired or the gravimetric density may be undesirably low. As examples of such effects, there may be cited the obtainment of unduly low gravimetric density with the use of lower mixing temperatures, the obtainment of an undesirably coarse product when amounts of water greater than specified above is mixed with the tetryl solution, and a product containing excessive amounts of undesirably small particles when the amount of water added to the tetryl solution is smaller than specified above.

In accordance with one procedure, constituting an illustrative embodiment of this invention, an acetone solution of tetryl containing 1.6 parts by weight of acetone per part of tetryl, is filtered and collected in a suitable vessel provided with means for agitation. With the solution at a temperature of 40°–50° C. and under vigorous agitation, 3–5 parts by weight of water per part of tetryl are added rapidly at a temperature of 50°–75° C. Agitation is continued until the tetryl has solidified, whereupon the agitation is discontinued and the product is separated from the warm mother liquor by decantation or preferably by filtration. After thorough washing with hot water and suitable drying and screening, the tetryl product is ready for use.

The explosive retained in solution in the mother liquor may be precipitated by the addition of cold water, filtered, and added to the crude material for treatment by the foregoing procedure. The diluted mother liquor may then advantageously be subjected to fractional distillation for recovery of the dissolved solvent.

A modification of the foregoing procedure which may at times be utilized to added advantage consists in adding more water to the mixture after the tetryl has solidified. The additional amount of water is such that the total amount is equal to about 8 times the weight of the tetryl originally in the solution, and permits the obtainment of an increased yield of satisfactory product. Such a result is not obtainable when this amount of water is mixed directly with the tetryl solution, since the solid product is then precipitated immediately and displays much poorer stability and an undesirably high content of coarse particles, and also, if the temperature of the added water is substantially below 50° C., an unduly low gravimetric density.

In accordance with a further embodiment, which appears to offer greatest advantage for the large scale production of tetryl, the separation of the product is effected in a continuous mode of operation. Large amounts of tetryl may be continuously prepared with the use of a suitable small capacity covered vessel, provided with a discharge outlet near the top, two inlets near the bottom, one for the tetryl solution and one for water, and a suitable mixing device, such as a propeller-agitator located between the two inlets. The tetryl solution may consist of a 40% by weight solution in a solvent consisting largely or entirely of acetone, which has been filtered and heated to a temperature of about 50° C. The water which is used is preferably distilled or otherwise treated to reduce the content of dissolved solids and is heated to a temperature of about 65° C. The liquids are introduced into the vessel at rates such that the proportion of water to tetryl is about 4:1 by weight. With the use of a cylindrical vessel, 22 inches high and 18 inches in diameter, provided with a three-inch-diameter propeller-type agitator, having three rounded blades and rotating 1750 R. P. M., for carrying out the treatment, rates of addition such that 333 pounds of tetryl pass through the vessel per hour have been found to yield an excellent product. In order to obtain a somewhat coarser product, the rate may be increased while a product containing a higher proportion of small particles may be obtained by lowering the rate.

The overflow from the treating vessel, consisting of a suspension of solidified tetryl particles in mother liquor at a temperature of 60°–65° C., is allowed to flow to suitable filter beds for separating the tetryl from the mother liquor. The discharged mother liquor may be subjected to treatment for recovery of the dissolved explosive and solvent content.

In a preferred mode of operation, however, additional water is mixed with the overflow from the treating vessel on its way to the filter beds. This additional water, which may be added at a temperature of about 20° C. to 65° C. and in the ratio of 4 parts of water per part of tetryl, provides the advantage of increasing the yield of desirable product. The mother liquor which is then discharged from the filter beds has a content of dissolved explosive which is too small and too impure to merit attempts at recovery. The dissolved content of solvent is, however, substantial and may be recovered by further dilution with water to precipitate the residual explosive, followed by fractional distillation of the decanted liquor.

A particularly favorable tetryl product may be obtained by the use in the process of this invention of an acidified solution of the explosive, containing for example, 0.5 to 0.40 parts of nitric acid per part of tetryl, in accordance with the process disclosed and claimed in the co-pending application of Jerome G. Burtle, Serial Number 402,720, filed July 16, 1941.

It is to be understood that the foregoing specific examples are illustrative and not limitative, and that variations and modifications may accordingly be made within the spirit of the invention, which, although not specifically described herein, are contemplated by and within the scope of the appended claims.

Having now described the invention, what is claimed as new and is desired to be secured by Letters Patent is:

1. In the manufacture of tetryl, the process comprising providing a 25% to 50% by weight solution of tetryl in a water-miscible organic solvent, at a temperature between about 40° C. and the boiling point of the said solvent and not higher than 90° C.; mixing said solution and water, equal in amount to 3 to 5 times the weight of the tetryl and having a temperature of 50° to 90° C., to precipitate tetryl in the liquid phase; and continuing the agitation to solidify the said tetryl.

2. In the manufacture of tetryl, the process comprising providing a 25% to 50% by weight solution of tetryl in a water-miscible organic solvent, comprising at least 80% by volume of acetone, at a temperature between about 40° C. and the boiling point of the said solvent; mixing said solution and water, equal in amount to 3 to 5 times the weight of the tetryl and having a temperature of 50° to 75° C., to precipitate tetryl in the liquid phase; and continuing the agitation to solidify the said tetryl.

3. In the manufacture of tetryl, the process comprising providing a 25% to 50% by weight solution of tetryl in a water-miscible organic solvent, comprising at least 80% by volume of acetone, at a temperature between about 40° C. and the boiling point of the said solvent; mixing the said solution and water, equal in amount to 3 to 5 times the weight of the tetryl and having a temperature of 50° to 75° C., to precipitate tetryl in the liquid phase; continuing the agitation to form a suspension of solid tetryl; and thereafter adding a further amount of water up to a total of about 8 parts of water per part of tetryl to the said suspension.

4. In the manufacture of tetryl, the process comprising providing a 25% to 50% by weight solution of tetryl in acetone, at a temperature of about 40° C. to 56° C., and mixing the said solution and water, equal in amount to 3 to 5 times the weight of the tetryl and having a temperature of 50° to 75° C.

5. In the manufacture of tetryl, the process comprising providing a 25% to 50% by weight solution of tetryl in acetone at a temperature of about 40° C. to 56° C.; mixing the said solution and water, equal in amount to 3 to 5 times the weight of the tetryl and having a temperature of 50° to 75° C., to precipitate tetryl in the liquid phase; continuing the agitation to form a suspension of solid tetryl; and thereafter adding a further amount of water up to a total of about 8 parts of water per part of tetryl to the said suspension.

6. A process in accordance with claim 4, in which the solvent consists predominantly of acetone.

7. A process in accordance with claim 4, in which the solvent consists predominantly of dioxane.

8. A process in accordance with claim 4, in which the solvent consists predominantly of methyl acetate.

9. In the manufacture of tetryl, the process comprising providing a 25% to 50% by weight solution of tetryl in a water-miscible organic solvent, at a temperature between about 40° C. and the boiling point of the said solvent and not higher than 90° C., and water, at a temperature of 50° to 90° C., continuously mixing said liquids in a vessel in a ratio of 3–5 parts of water per part of tetryl, and continuously discharging a suspension of solid tetryl from the said vessel.

10. In the manufacture of tetryl, the process comprising providing a 25% to 50% by weight solution of tetryl in a water-miscible organic solvent, at a temperature between about 40° C. and the boiling point of the said solvent and not higher than 90° C., and water, at a temperature of 50° to 90° C., continuously mixing said liquids in a vessel in a ratio of 3–5 parts of water per part of tetryl, continuously discharging a suspension of solid tetryl from the said vessel, and thereafter adding to the said suspension a further amount of water up to a total of about 8 parts of water per part of tetryl.

11. In the manufacture of tetryl, the process comprising providing a solution of substantially 40% by weight of tetryl in acetone, at a temperature of about 50° C., and water, at a temperature of about 65° C., continuously mixing said liquids in a vessel in a ratio of 3–5 parts of water per part of tetryl, and continuously discharging a suspension of solid tetryl from the said vessel.

12. In the manufacture of tetryl, the process comprising providing a solution of substantially 40% by weight of tetryl in acetone, at a temperature of about 50° C., and water at a temperature of about 65° C., continuously mixing said liquids in a vessel in a ratio of 3 to 5 parts of water per part of tetryl, continuously discharging a suspension of solid tetryl from the said vessel, and thereafter adding to said suspension a further amount of water up to a total of about 8 parts of water per part of tetryl.

DELBERT R. JONES.